United States Patent [19]

Gabriel et al.

[11] 4,221,924

[45] Sep. 9, 1980

[54] END SEALS FOR PRE-CONNECTORIZED TELEPHONE CABLES

[75] Inventors: Anthony P. Gabriel, Staten Island, N.Y.; John D. Lawler, Mt. Pleasant Village, N.J.

[73] Assignee: General Cable Corporation, Greenwich, Conn.

[21] Appl. No.: 909,384

[22] Filed: May 25, 1978

[51] Int. Cl.³ .......................................... H02G 15/04
[52] U.S. Cl. .................................. 174/10; 174/74 A; 174/135
[58] Field of Search ................... 174/10, 74 A, 76, 87, 174/135, 138 F; 339/36, 116 R, 116 C

[56] References Cited

U.S. PATENT DOCUMENTS

| | | | |
|---|---|---|---|
| 3,427,392 | 2/1969 | Plummer | 174/138 F X |
| 3,519,728 | 7/1970 | Gillemot | 174/76 |
| 3,579,863 | 5/1971 | McGrath | 174/10 |
| 3,585,275 | 6/1971 | Gillemot et al. | 174/87 X |
| 3,781,461 | 12/1973 | Thompson et al. | 174/138 F X |
| 3,919,460 | 11/1975 | Neail et al. | 174/87 |
| 3,962,554 | 6/1976 | Eigel | 174/74 A |

FOREIGN PATENT DOCUMENTS

| | | | |
|---|---|---|---|
| 1520148 | 2/1968 | France | 174/10 |
| 16972 | of 1898 | United Kingdom | 174/74 A |
| 1065431 | 4/1967 | United Kingdom | 174/84 R |

*Primary Examiner*—Laramie E. Askin
*Attorney, Agent, or Firm*—Roy C. Hopgood; John M. Calimafde; Charles W. Neill

[57] ABSTRACT

This invention provides relatively simple and inexpensive end seals for protecting the ends of telephone cables that are preconnectorized at the factory or distribution center. These end seals are moisture-proof, able to retain pressure and afford mechanical protection while the preconnectorized cables are carried in inventory and during handling to a place of use in the field.

4 Claims, 5 Drawing Figures

END SEALS FOR PRE-CONNECTORIZED TELEPHONE CABLES

BACKGROUND AND SUMMARY OF THE INVENTION

Since the beginnings of telephony, field splicing of telephone cables has been labor intensive, this labor being highly skilled. Even though numerous changes have occurred in splicing hardware (e.g. solderless connectors, bolt-on splice cases, etc.), splicing still remains high labor intensive.

The recent introduction of cables preconnectorized at the factory (or distribution center) results in a fast and simple field connection of cables, substantially reducing labor, while generally improving splice quality (i.e., since grounds, crosses, and opens, etc., are corrected, for the most part, at the factory).

One problem that arises in this area of cable preconnectorization occurs in transit and during storage of the finished and pre-connectorized cable. The connectorized cable ends represent delicate sections prone to mechanical damage. In addition, the very physical configuration of these ends precludes the use of conventional end seals.

This invention provides a relatively simple end seal which has the properties of being moistureproof, able to retain pressure, afford mechanical protection, of low cost and therefore disposable, and readily applied in the factory environment with a minimum of tools and skill. The seal requires a minimum of capital investment and inventory space.

This invention has envelopes, which are at least semi-flexible and made of thin metal foil and plastic that is inexpensive and that is both moistureproof and gastight. The envelope encloses the preconnectorized structure and is sealed to the jacket of the cable beyond the preconnectorized conductors.

The term "preconnectorized" is used herein to designate a cable which has its outer jacket and shield, that surround the cable conductors, terminated back from the ends of the conductors of the cable; and that has connectors secured to the ends of the conductors that project beyond the jacket and shield. The connectors are secured to the conductors at the factory or other locations before the cable is brought to the place where the conductors are to be joined with corresponding conductors of another cable or termination.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
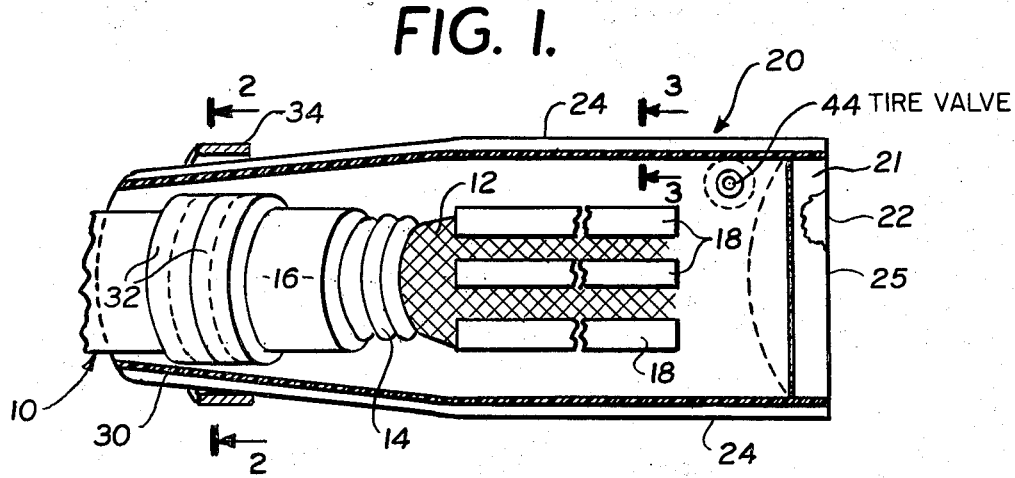
FIG. 1 is a diagrammatic preconnectorized telephone cable enclosed in a protecting envelope made in accordance with this invention, the envelope being shown in section.
Figure 2:
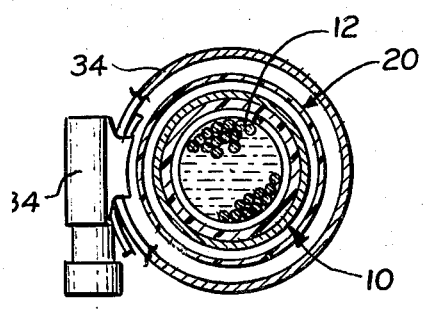
FIG. 2 is a sectional view taken on the line 2—2 of FIG. 1.

FIG. 1 shows a communication cable 10 which has cable pairs, designated by the reference character 12, projecting beyond a cable shield 14, which is corrugated in cables of substantial size. The cable shield 14 is enclosed in a cable jacket 16. The construction thus far described is conventional.

Connectors 18 are secured to the conductors of the cable pairs 12. Three such connectors are shown in FIG. 1; but it will be understood that each conductor of the cable has a connector secured to the portion of the conductor which extends beyond the shield 14. In order to provide a clearer and more easily understood drawing, the illustration is simplified by showing only three of the connectors 18 which are representative of connectors on all conductors at the cable end. These connectors are secured to the conductors at the factory where the cable is manufactured or at a distribution center equipped for applying the connectors and for testing the cable for grounds, crosses and opens in the circuits of the cable.

The cable 10, with the connectors secured to the individual conductors at a factory or distribution center, is referred to in the trade as a "pre-connectorized cable." It will be evident that the end of such a cable, with large numbers of connectors secured to the individual conductors, can be easily damaged when being put into inventory storage, or removed from such storage, and during transportation. This invention provides protection against such damage by protective means which are simple and inexpensive so that they can be disposed of after the cable has been connected with another cable or termination.

Figure 5:
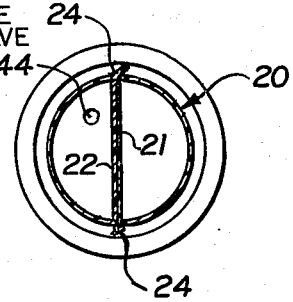
FIG. 5 is an end view of the structure shown in FIG. 4.

An envelope 20, preferably made of thermoplastic sheet material, surrounds the connectors 18 and the end portion of the cable 10 for some distance along the jacket 16. The envelope 20 is preferably made in two parts 21 and 22 which are sealed around the cable 10 at one end and sealed together along seal lines 24 and at line 25 at the end of the envelope 20; and this sealing can be done quickly and inexpensively by impulse heat sealers or other appropriate apparatus for joining the edge portions of plastic sheet material to form envelopes or containers. FIGS. 1 and 5 show the sheets of plastic 21 and 22 sealed to one another along a seal line 24 at the edges of the sheets 21 and 22 (FIG. 5) at tabs formed at the seal line 24 by overlapping edges of the plastic sheets 21 and 22.

Referring again to FIG. 1, the envelope 20 has a neck portion 30, which surrounds the cable jacket 16. Sealing tape 32 is wrapped securely around the jacket 16 to form an envelope-to-jacket hermetic sealing gland. The envelope neck portion 30 is then pressed into intimate contact with the sealing tape 32 by a clamp 34 or clamps which may be a conventional hose clamp, which insures a 360° seal, such as used on automobile cooling hoses. When the pre-connectorized cable is to be connected in the field, the hose clamp 34 is released and the envelope 20 is removed from the cable.

Figure 3:
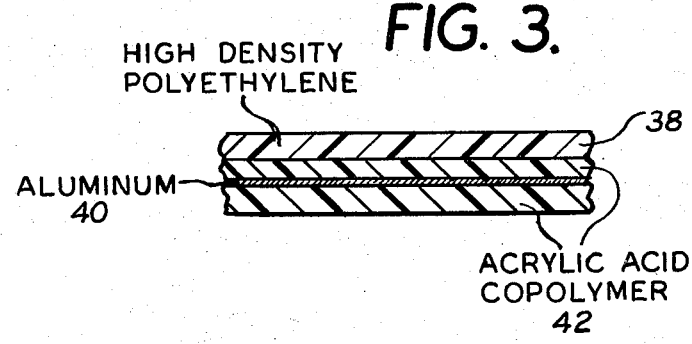
FIG. 3 is a greatly enlarged, fragmentary, sectional view through the wall of the envelope, the section being taken on the line 3—3 of FIG. 1.

The material used for the envelope 20 is preferably impervious to water vapor, as well as to water itself. Such a material provides maximum protection against the deleterious effects of moisture on the structure enclosed within the envelope, and one such material is shown on an enlarged scale and in section in FIG. 3. An outer layer of plastic 38, such as high-density polyethylene, is bonded to a layer of aluminum foil 40 by an adhesive, such as an acrylic acid copolymer 42. The aluminum foil 40 is preferably coated on both sides by the adhesive 42 for adhering the envelope material to a similar piece of material used for adjacent portions of the envelope when sealing portions of the envelope together. The copolymer 42 also provides corrosion protection to the aluminum foil 40. One such material was marketed by the Dow Chemical Company under the title of "ZETABON No. QX-4446-54". Similar materials are made by other manufacturers of plastic sheets. Suitable thicknesses for this material have approximately 5 mils of the high-density polyethylene; 4 mils of acrylic acid copolymer between the polyethylene and the aluminum foil 40 with a minimum thickness of 0.7 mils; and slightly thicker (5 mils) layer of the acrylic acid copolymer on the side of the aluminum foil facing away from the polyethylene.

Other kinds of plastic material can be used, but the metal foil must be incorporated, and with other adhesives that will bond the portions of the envelope together securely, even when subject to moisture. The plastic material used for the envelope can also be made of thermoplastic sheets which can be bonded to one another by fusion, provided that the fusion connections are flexible enough to withstand a certain amount of bending, and are strong enough to withstand some pressure within the envelope in excess of the ambient atmospheric pressure around the outside of the envelope.

Figure 4:
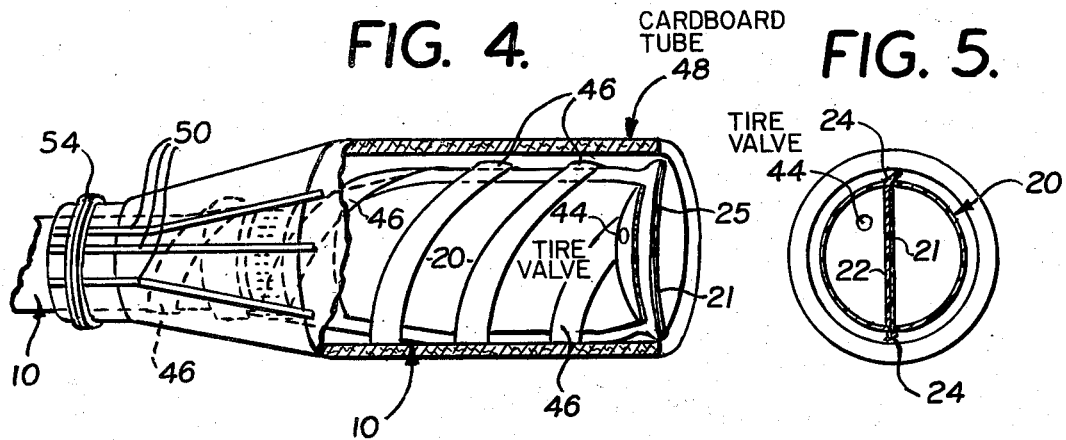
FIG. 4 is a view of the structure shown in FIG. 1, with a protection tube applied over the envelope for use with pulp insulated cable when it is desirable to afford additional mechanical protection to the envelope.

The envelope should have the capability of pressurization if needed. This is easily achieved by introduction of a simple bolt-on tire valve. This valve can be placed in virtually any position on the envelope prior to sealing the parts of the envelope together; but the preferred location for the valve is near the forward end of the envelope; that is, the end of the envelope most remote from the cable shield 14. In the embodiment of the invention illustrated in FIGS. 1 and 5, the tire valve 44 is preferably located near the end of the envelope wall in order to make it more accessible when the envelope is enclosed in a protective housing, which will be described in connection with FIGS. 4 and 5.

Since the cable pressurization will cause hoop stresses in the fabricated envelope 20, it is advisable to apply helical overlapped wrap filament tapes 46, made of plastic and containing reinforcing strands such as used for wrapping packages.

In order to afford a degree of mechanical protection to the envelope 20, a tube 48, preferably made of heavy cardboard (or any other relatively inexpensive material), can be placed over the envelope 20 and secured to the cable jacket 10. To aid in the attachment of the tube 48 to the cable jacket, longitudinal slits 50 are cut in the cardboard of the tube 48, and these slits may be made by cutting tapered sections from the wall of the tube 48 to provide a smooth taper from the maximum diameter of the tube down to the diameter of the cable jacket. The protecting tube 48 is held on the cable 10 by a clamp 54. The forward end of the tube 48 is preferably of generally cylindrical cross-section and extends forward as far as the end of the envelope 20 which is remote from the cable jacket and open at the front end of the tube. The tire valve 44 is in an opening through an end wall of the envelope 20. Both the valve 44 and the opening through which it extends are accessible from outside the tube 48 through the open end of the tube 48.

The preferred embodiment of the invention has been illustrated and described but changes and modifications can be made and some features can be used in different combinations without departing from the invention as defined in the claims.

What is claimed is:

1. The combination comprising a protection device and a telephone cable that has a jacket and conductors which have pre-connectorized ends, said protection device comprising an envelope closed at all sides except for a rearward neck end of the envelope that surrounds a jacket portion of the cable, the envelope being long enough to contain the end portion of the cable having the pre-connectorized ends of the conductors, means securing the neck end of the envelope to the jacket of the cable, an outer protecting tube surrounding the envelope to provide mechanical protection for the envelope during transport of the cable to a place where the pre-connectorized conductors are to be connected with other conductors, and the protecting tube having an end tapered down to a reduced diameter beyond the connection of the envelope to the jacket and being secured to the jacket at the small end of the taper.

2. The combination described in claim 1 further characterized by the protecting tube being made of cardboard or the equivalent and having slits in the part of the protecting tube that tapers, with the portions of cardboard or the equivalent on both sides of the slits overlapping one another to effect a reduced diameter of the taper, and means clamping the overlapping portions on opposite sides of the slits against the jacket of the cable beyond the envelope.

3. The combination comprising a protection device and a telephone cable that has a jacket and conductors which have pre-connectorized ends, said protection device comprising an envelope closed at all sides except for a rearward neck end of the envelope that surrounds a jacket portion of the cable, the envelope being long enough to contain the end portion of the cable having the preconnectorized ends of the conductors, means securing the neck end of the envelope to the jacket of the cable, an outer protecting tube surrounding the envelope to provide mechanical protection for the envelope during transport of the cable to a place where the preconnectorized conductors are to be connected with other conductors, and the protecting tube being of generally cylindrical cross-section and extending forward as far as the end of the envelope which is remote from the cable jacket, and said protecting tube being open at its front end.

4. The combination described in claim 3 further characterized by an opening in a wall of the envelope that faces toward the open end of the protecting tube, a valve in said opening, both the opening and the valve being accessible from outside the protecting tube through the open end thereof.

* * * * *